No. 670,780. Patented Mar. 26, 1901.
J. HOOPES.
SHUTTER BOWER.
(Application filed July 25, 1900.)
(No Model.)
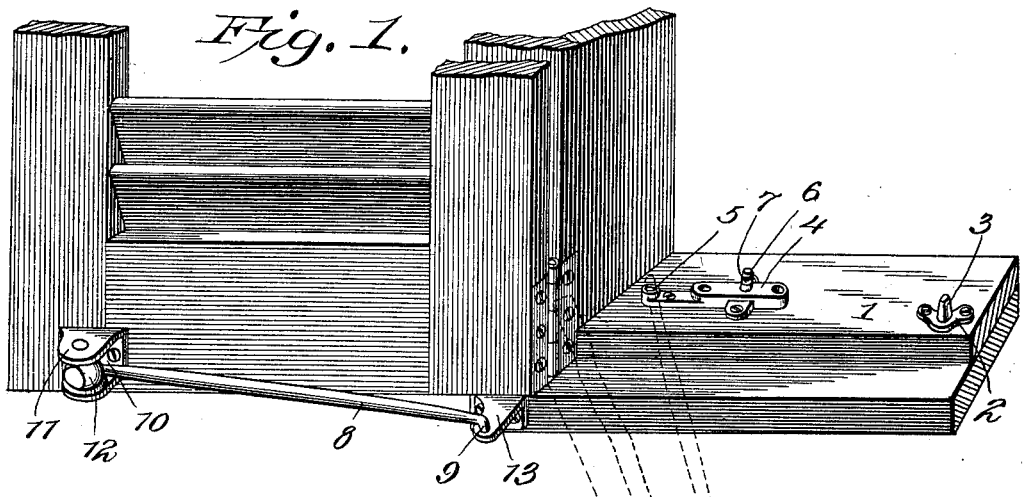
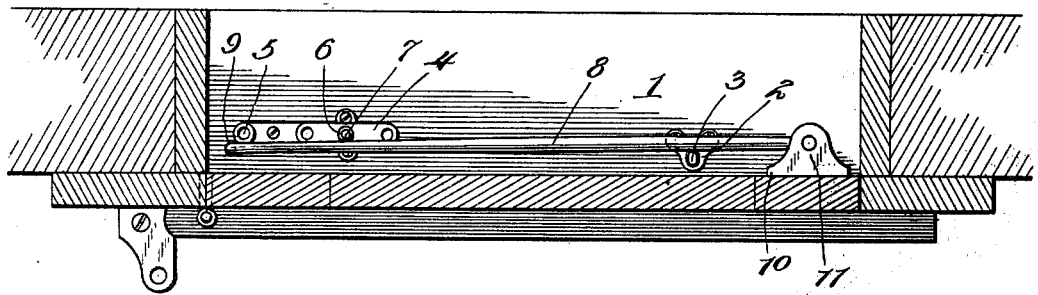
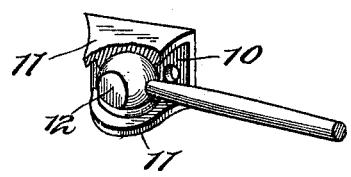
Witnesses
Inventor,
Jefferson Hoopes,
Henry T. Bright
Attorney

UNITED STATES PATENT OFFICE.

JEFFERSON HOOPES, OF MARSHALLTON, DELAWARE.

SHUTTER-BOWER.

SPECIFICATION forming part of Letters Patent No. 670,780, dated March 26, 1901.

Application filed July 25, 1900. Serial No. 24,848. (No model.)

*To all whom it may concern:*

Be it known that I, JEFFERSON HOOPES, a citizen of the United States, residing at Marshallton, in the county of Newcastle and State of Delaware, have invented certain new and useful Improvements in Shutter-Bowers; and I do hereby declare the following to be a full, clear, and exact description of the invention, such as will enable others skilled in the art to which it appertains to make and use the same.

This invention relates to attachments for shutters, and has for one object to provide a device which shall serve to hold a shutter at varying degrees of adjustment between a wholly closed and an entirely open position.

A further object of the invention is to provide novel means whereby the arm employed for retaining the shutter in its adjusted position may be utilized also for the purpose of retaining said shutter closed in a locked condition, that it may not be opened from the outside.

Furthermore, the object of the invention is to provide means whereby the joint of the arm and its bracket will permit of certain adjustments in order that the securing-arm may assume an incline position, which is necessary to accomplish certain results, as will be more fully explained.

With the above and other objects in view the invention consists in the details of construction and in the arrangements and combination of parts to be hereinafter more fully set forth and claimed.

In describing the invention in detail reference will be had to the accompanying drawings, forming part of this specification, wherein like characters denote corresponding parts in the several views, and in which—

Figure 1 is a perspective view of a portion of a window-sill and the shutter with the attachment adjusted to hold the shutter open, and in dotted lines an intermediate adjustment of the parts is illustrated. Fig. 2 is a horizontal sectional view of a shutter, showing the attachment in plan. Fig. 3 is a detail view of the ball-and-socket joint.

In the drawings, 1 indicates a window-frame, *a* the sill, and 2 a plate on the frame, having an upturned stud 3, the inner face of which stands at right angles to the upper surface of the plate. An elongated plate 4 is also secured to the sill and is provided with a series of apertures 5, suitably spaced. The plate 4 has formed therewith a stud 6, having its side recessed, as shown at 7, the purpose of which will be presently described.

The means for holding the shutter at varying degrees of adjustment comprises an arm 8, having an angular end 9, adapted to enter the apertures 6 of the plate, and it will be observed that the position of the shutter may be regulated as shown by dotted lines, according to the requirements and desires of the user. The arm is attached to the shutter through the agency of a bracket 10, having ears 11, with their facing surfaces recessed to form sockets, in which the ball 12 on the end of the arm 8 is seated, thus producing a ball-and-socket joint between the arm and bracket. This feature of the invention is a very important one, for while the pivotal point would be in a vertical plane when the end of the arm is in engagement with the plate 4, the plane of the pivot would change when the arm is in an inclined position, as shown in full lines, Fig. 1, or when the arm is in place to lock the shutter in a closed position.

A bracket 13 is fastened to the outer edge of the sill, near the end, for engagement of the arm when the shutter is thrown entirely open.

As shown in Fig. 1, the arm is wedged between the studs 3 and 6, and it is my purpose to shape the arm elliptical in cross-section, so that it will cam over the edge of the upper end of the stud and spring into engagement with said stud and in the recess 7. When in this position, the arm is not lying in a horizontal plane, but is inclined slightly. Thus the function and the advantage of the ball-and-socket joint of the arm is evidenced, as it permits the arm to be swung over the stud and depressed on an incline until said arm springs into the recess of the stud.

The construction, operation, and advantages will, it is thought, be understood from the foregoing description, it being noted that various changes in the proportions and other details of construction may be resorted to for successfully carrying the invention into practice without departing from the scope of the claims.

Having fully described the invention, what I claim as new, and desire to secure by Letters Patent, is—

1. In a shutter-bowing attachment, a flexible arm connected to a shutter by a ball-and-socket joint, a plate on the window-frame having a stud, and second plate having apertures and a stud, and a right-angular extension on the arm adapted to enter the apertures of the plate and means whereby the arm is sprung between the studs for holding the shutter closed.

2. In a shutter-bowing attachment a bracket attached to the shutter said bracket having ears with recesses forming a socket, a flexible arm having a ball and fitting in the socket, plates having disalined studs, said plates being attached to the window-frame and so positioned as to permit the arm to be sprung therebetween.

3. In a shutter-bowing attachment a flexible arm, elliptical in cross-section, suitably pivoted to the shutter, studs formed with plates attached to the window-frame, one of said studs having a recessed side, the said parts being so positioned, as to permit the arm to be wedged between the studs, as and for the purpose described.

In testimony whereof I have affixed my signature in presence of two witnesses.

JEFFERSON HOOPES.

Witnesses:
JOHN J. GARVEY,
BAYARD EASTBURN.